(12) United States Patent
Dieckmann et al.

(10) Patent No.: US 10,674,361 B2
(45) Date of Patent: Jun. 2, 2020

(54) METHOD FOR AUTHORIZATION IN A WIRELESS VEHICLE NETWORK

(71) Applicant: WABCO GmbH, Hannover (DE)

(72) Inventors: Thomas Dieckmann, Pattensen (DE); Andelko Glavinic, Sarstedt (DE); Ulf Laude, Hambühren (DE); Thomas Wolf, Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 16/387,240

(22) Filed: Apr. 17, 2019

(65) Prior Publication Data

US 2019/0246280 A1    Aug. 8, 2019

Related U.S. Application Data

(62) Division of application No. 15/127,871, filed as application No. PCT/EP2015/000419 on Feb. 24, 2015, now Pat. No. 10,299,129.

(30) Foreign Application Priority Data

Mar. 22, 2014 (DE) .......... 10 2014 004 182
Jul. 8, 2014 (DE) .......... 10 2014 010 089

(51) Int. Cl.
*H04W 12/08* (2009.01)
*H04L 29/06* (2006.01)
(Continued)

(52) U.S. Cl.
CPC ............ *H04W 12/08* (2013.01); *G06F 21/44* (2013.01); *H04L 63/107* (2013.01); *H04L 63/18* (2013.01); *H04L 67/12* (2013.01)

(58) Field of Classification Search
CPC ........ H04W 12/08; H04L 63/18; H04L 67/12; H04L 63/107; G06F 21/44
(Continued)

(56) References Cited

U.S. PATENT DOCUMENTS 6,906,632 B2 * 6/2005 DeLine .................... B60R 1/12
340/425.5
10,299,129 B2 * 5/2019 Dieckmann .......... H04L 63/107
(Continued)

FOREIGN PATENT DOCUMENTS

DE   102011011843 A1   3/2012
DE   102012012565 A1   12/2013
(Continued)

OTHER PUBLICATIONS

International Search Report for PCT/EP2015/000419 dated Sep. 1, 2015, 8 pages.
(Continued)

*Primary Examiner* — Aravind K Moorthy
(74) *Attorney, Agent, or Firm* — Warner Norcross + Judd LLP

(57) ABSTRACT

A method for authorization in a wireless vehicle network is disclosed. In particular, the method is for authorizing communication between a mobile communications unit and a vehicle-based communications unit assigned to a control unit in a vehicle, wherein there is an unauthorized connection between the mobile communications unit and the vehicle-based communications unit. In the method, the mobile unit sends to the vehicle-based unit a request to authorize communication. Thereupon, the vehicle-based unit sends to the mobile unit from which the request came, an instruction to perform an action on the vehicle. An operator who has access to the mobile unit and to the vehicle performs the action. The control unit detects the performed action. The vehicle-based unit authorizes communication with the mobile unit.

16 Claims, 2 Drawing Sheets

(51) Int. Cl.
*H04L 29/08* (2006.01)
*G06F 21/44* (2013.01)

(58) Field of Classification Search
USPC .......................................................... 726/4
See application file for complete search history.

(56) References Cited

U.S. PATENT DOCUMENTS

| | | | |
|---|---|---|---|
| 2008/0136611 A1 | 6/2008 | Benco et al. | |
| 2008/0303648 A1 | 12/2008 | Day | |
| 2010/0073125 A1* | 3/2010 | Alrabady | H04L 9/3247 |
| | | | 340/5.2 |
| 2011/0210830 A1 | 9/2011 | Talty et al. | |
| 2011/0215901 A1 | 9/2011 | Van Wiemeersch et al. | |
| 2012/0129493 A1* | 5/2012 | Vasudevan | B60R 25/24 |
| | | | 455/411 |
| 2013/0035117 A1* | 2/2013 | Litkouhi | H04L 67/12 |
| | | | 455/456.4 |
| 2013/0151064 A1* | 6/2013 | Becker | G07C 5/008 |
| | | | 701/31.4 |
| 2013/0179005 A1* | 7/2013 | Nishimoto | B60R 25/1001 |
| | | | 701/2 |
| 2014/0327778 A1* | 11/2014 | McQuade | H04L 63/107 |
| | | | 348/156 |
| 2015/0113638 A1* | 4/2015 | Valasek | H04L 63/1408 |
| | | | 726/22 |
| 2015/0170429 A1* | 6/2015 | Denny | B60W 30/09 |
| | | | 701/36 |
| 2015/0339334 A1 | 11/2015 | Hanke | |
| 2016/0055699 A1* | 2/2016 | Vincenti | G07C 9/00309 |
| | | | 340/5.61 |
| 2016/0283963 A1* | 9/2016 | Zafiroglu | G06Q 30/0224 |

FOREIGN PATENT DOCUMENTS

| | | |
|---|---|---|
| GB | 2505949 B | 8/2018 |
| WO | 2009042256 A2 | 4/2009 |
| WO | 2013124730 A1 | 8/2013 |

OTHER PUBLICATIONS

Mercedes-Benz, "M+P-03F-8023 / 03F021-10", Mar. 17, 2011, 21 pages.

* cited by examiner

METHOD FOR AUTHORIZATION IN A WIRELESS VEHICLE NETWORK

CROSS-REFERENCE TO RELATED APPLICATIONS

This application is a divisional of U.S. application Ser. No. 15/127,871, filed on 21 Sep. 2016, which was the National Stage of International Application No. PCT/EP2015/000419, filed on 24 Feb. 2015, which claims priority to and all advantages of German Patent Application No. 10 2014 004 182.4, filed on 22 Mar. 2014, and German Patent Application No. 10 2014 010 089.8, filed on 8 Jul. 2014, the contents of which are hereby incorporated by reference.

FIELD OF THE INVENTION

The present invention generally relates to a method for authorization in a wireless vehicle network and, more specifically, to a method for authorization, a system for implementing the method, and a control unit for use in the wireless vehicle network.

BACKGROUND OF THE INVENTION

During operation of a utility vehicle, data is produced which is provided to a driver in a driver's cab on display instruments or other output devices. For example, the driver of a heavy goods vehicle having air suspension and electronic braking systems receives in addition to information on the speed and engine speed information on the system pressure (pressure in the braking system), on the axle load (via bellows pressure sensors), on the distance to rear obstructions (via proximity sensors), etc. Some of the data are transmitted directly to the display instruments in the driver's cab, and some via an in-vehicle data bus system, for instance a CAN data bus system.

The CAN data bus system, which is established throughout Europe, only allows specified data to be transferred. Specific data that only arise in a certain vehicle type and that are not yet specified for the CAN data bus are not transmitted and hence in some cases cannot be read by the driver in the driver's cab. An additional communications path between driver and vehicle is needed or at least of interest.

In a truck-trailer combination including a plurality of vehicle units, specifically tractor unit and one or more trailer vehicles, data from the trailer vehicles can be transferred to the towing vehicle via standardized interfaces, for instance via the CAN bus system or a Powerline adapter or by other means. This requires the tractor unit and the trailer vehicles to be fitted with relevant technical equipment. The data are typically brought together in an electronic control unit and made available to the data bus system. The control unit must comprise a suitable interface for the data bus system. The electrical connection that normally exists between tractor unit and trailer vehicle or between successive trailer vehicles allows only a very limited amount of CAN data to be transmitted. Again in this case, an additional communications path is necessary or at least advantageous.

Even after being parked, utility vehicles are often meant to perform actions and/or provide the driver or another operator with information. In this case, the operating person is typically outside the vehicle. A communications facility that does not require the operator to be in the driver's cab for this purpose is useful.

Mobile communications devices such as smart phones, tablet PCs and other small computers with the facility to establish and use a wireless communications connection, for instance also via WLAN (Wireless Local Area Network), are now widely established. If a vehicle is fitted with suitable technical equipment, the operator could use the smart phone to establish a connection to the vehicle and to obtain information and/or perform functions in the vehicle. What is required first is to set up a wireless connection between the smart phone and the vehicle, in which process it should be ensured that only authorized operators can establish a connection. If the intention is to actuate functions of the vehicle, it is sensible if only one authorized operator has access to the vehicle. Otherwise functions may be invoked unintentionally or in a conflicting manner.

DE 10 2012 012 565 A1 discloses connecting a smart phone to a communications unit of a vehicle via WLAN. In order to set up and authenticate the WLAN connection, the data required for this purpose (network name, network key, password) are transmitted to the smart phone via USB cable, NFC or as a QR code. The operator no longer needs to type the data into the smart phone. The document also claims the use of a Bluetooth wireless connection between smart phone and communications unit of the vehicle. The cited document DE 10 2012 012 565 A1 explains the acronyms used above (WLAN, USB, NFC, QR-Code, Bluetooth) and others.

WO 2013/124730 A1 discloses a trailer vehicle having an electronic brake control unit, which unit is connected to the CAN data bus via a standard ISO 11992 interface. A communications unit, which works as what is called a trailer access point and contains a transceiver compliant with the WLAN standard IEEE-802.11, is also connected to the CAN data bus. The trailer access point can be connected via WLAN to a smart phone or to a navigation system in a tractor unit. To avoid unintended connections, the trailer access point can keep a list of allowed numbers of potential network partners. Maintaining this list is time-consuming. A high degree of flexibility in handling different tractor units and trailer vehicles by different drivers is hence not possible.

Network devices that have been connected to one another before in a wireless vehicle network can delete the connection data needed to set up the connection and re-import the data before every connection setup, for instance by way of the aforementioned QR-code capture, or can store the connection data so that next time the connection can be set up automatically and without re-capturing the QR code. The latter option is advantageous for reasons of convenience. The situation can thereby arise in which a trailer access point establishes automatic connections to a plurality of smart phones as clients in the WLAN or in another wireless network. As long as the clients are only retrieving information, this is usually not critical. Dangerous situations can arise if an operator/driver is connected by his smart phone via WLAN to the communications unit of a vehicle and wishes to perform control functions, for instance in the sense of remote control. For this purpose, it must be ensured that the smart phone is connected to the vehicle that the driver/operator actually wishes to control remotely. A connection to another vehicle must not exist inadvertently.

SUMMARY OF THE INVENTION

One object of the invention is the safe authorization of communication between two communications units in a wireless vehicle network. A mobile communications unit belonging to a driver/operator is included as part of the wireless vehicle network.

A method according to the invention for authorization in a wireless vehicle network, specifically for authorizing communication between a mobile communications unit and a vehicle-based communications unit assigned to a control unit in a vehicle, is disclosed. The method assumes that there is an unauthorized connection between the mobile communications unit and the vehicle-based communications unit. The following steps are then provided:

a) the mobile communications unit sends to the vehicle-based communications unit a request to authorize communication;

b) the vehicle-based communications unit sends to the mobile communications unit from which the request came, an instruction to perform an action on the vehicle;

c) an operator who has access to the mobile communications unit and to the vehicle performs the instructed action;

d) the control unit detects the performed action, and the vehicle-based communications unit authorizes communication with the mobile communications unit.

The mobile communications unit and the vehicle-based communications unit are initially connected to one another via a wireless connection, albeit having limited rights. The mobile communications unit cannot invoke remote-control functions. The connection is therefore referred to as unauthorized.

An additional authorization is performed for invoking functions. This starts with a request by the mobile communications unit to the vehicle-based communications unit. The vehicle-based communications unit replies with an instruction to perform an action on the vehicle. For example, this instruction is a prompt to actuate the service brake twice. The operator reads this instruction on his mobile communications unit and performs the instructed action. In this case, the operator can also make use of an assistant, both for reading the mobile communications unit and for performing the instructed action in the vehicle.

The performed action is detected by the control unit in the vehicle, for example by monitoring brake pressures or a tail-light signal or by other techniques or mechanisms.

The vehicle-based communications unit assigned to the control unit authorizes communication with the mobile communications unit. The access rights of the mobile communications unit to the vehicle-based communications unit are hence extended to invoking functions. In addition, a confirmation can be transmitted to the mobile communications unit.

The method according to the invention facilitates authorization between the communications units and avoids unintentionally authorized connections. In particular, this helps to increase occupational safety when using a wireless vehicle network.

According to one embodiment of the invention, the control unit can initiate in conjunction with, or after, step d), a visual or audible or measurable action of the vehicle. For example, the control unit can control actuators in the vehicle directly or via the CAN data bus and produce a valve hiss, actuation of direction-indicator lights or generate other signals perceptible to the operator. A confirmation can also be made via the mobile communications unit.

According to another embodiment of the invention, the communication between mobile communications unit and vehicle-based communications unit is performed in encrypted form, in particular using symmetrical encryption. A required key can be part of the network data, which are already part of the unauthorized connection. It is also possible to input a key. Symmetrical encryption exists if the key is part of an optically detectable pattern on the vehicle and has been read by the mobile communications unit. The same applies to the case in which a key present in the control unit of the vehicle is passed, for example, to the operator together with a job, and the operator enters the key into the mobile communications unit.

According to certain embodiments of the invention, the authorization of communication can include remote control of functions in the vehicle by the mobile communications unit. The remote control is limited only by the capabilities of the control unit assigned to the vehicle-based communications unit. Such capabilities also include the software installed in the control unit and the functions inside the vehicle that can be controlled from the control unit.

Advantageously, the unauthorized connection includes the facility for the mobile communications unit to retrieve information about the vehicle. This information includes, for instance, status information about the system pressure in an air brake system, axle loads and details of the vehicle model.

According to various embodiments of the invention, the vehicle network is a WLAN, in particular containing the mobile communications unit as a client. A wireless network compliant with standard IEEE-802.11 (if applicable including enhancements b/g/n/c and future enhancements) is typically intended as the WLAN. The vehicle-based communications unit is typically an access point in the network, whereas the mobile communications unit communicates as a client with the access point. The vehicle network can also use other wireless technologies such as Bluetooth, GSM, UMTS, LTE and others. Proprietary technologies for establishing a network are also possible. All that matters is that data and instructions can be transferred.

According to further embodiments of the invention, the unauthorized connection is established by scanning an optically detectable pattern into the mobile communications unit, wherein there is an association between the optically detectable pattern and the vehicle-based communications unit, and wherein the optical pattern contains all the data that is needed to set up the connection between mobile communications unit and vehicle-based communications unit. The optical pattern in particular may be a QR code, a data matrix code, a barcode or another pattern. The pattern itself can be encrypted, with the result that only encrypted data and not data in plain text is read, for instance using a QR reader. The mobile communications unit generally contains the key required for decryption.

According to embodiments of the invention, a mobile phone, in particular a mobile phone having optical sensor and/or WLAN function, can be used as the mobile communications unit. A smart phone comprising camera and WLAN function may also be utilized. A Bluetooth function can be provided alternatively or additionally. The mobile phone contains special software for communicating with the vehicle-based communications unit. In particular, the software is what is known as an app, which is provided by the supplier of the control unit fitted in the vehicle and is offered for download via the Internet.

Modern smart phones comprise a camera, a WLAN function and a Bluetooth function and are suitable for the installation of an additional app. Thus no special hardware is required for the mobile communications unit. All that is required is the app mentioned.

According to another embodiment of the invention, it is provided that in addition to a first vehicle-based communications unit, at least one second vehicle-based communications unit assigned to a control unit is present in the wireless vehicle network, which second vehicle-based communications unit is part of an additional vehicle, that there is an unauthorized wireless connection between the two vehicle-based communications units, that there is a physical-mechanical connection between the vehicles, that the first vehicle-based communications unit sends to the second vehicle-based communications unit via the wireless connection a request to authorize communication, that then one of the two vehicle-based communications units prompts the other vehicle-based communications unit via the wireless connection for an acknowledgment, that the acknowledgment is made on the physical-mechanical connection, and that after acknowledgment is made, an authorized wireless connection is set up between the two vehicle-based communications units.

A trigger for the authorization can be in particular a request by the mobile communications unit, for instance to set up an authorized connection between the mobile communications unit and a vehicle. If an additional vehicle is then coupled onto the latter, there is a physical-mechanical connection between the vehicles. There is also the wish to control functions of the coupled-on vehicle via the wireless network.

One of the two vehicle-based communications units sends the authorization prompt to the other vehicle-based communications unit and prompts for an acknowledgment or is prompted for an acknowledgment. The acknowledgment is made on the physical-mechanical connection, for instance by pressure variations in the air brake system or by an electrical signal along a wired line. After acknowledgment has been received, there is certainty about the identity of the other communications unit, and therefore an authorized wireless connection can be set up in this case.

The initially unauthorized wireless connection can be established by an automatic connection based on connection data known to each party. For example, a connection may have existed previously, with the connection data thereof having been stored in the vehicle-based communications units. After this unauthorized connection has been established, however, it is not certain whether coupled-on vehicles are involved. A connection can be made equally well between vehicles standing next to one another. To rule out the latter situation, the acknowledgment is made on the physical-mechanical connection.

Alternatively, the one communications unit prompts the other communications unit via the physical-mechanical connection for acknowledgment, for instance by electrical signals on a wired line. The acknowledgment itself is then made via the wireless connection or again via the physical-mechanical connection.

Using the above method it is possible to incorporate into the existing authorized connection between the mobile communications unit and vehicle-based communications unit an additional vehicle having an additional communications unit. This can be done automatically as soon as the communications unit of the additional vehicle is visible in the existing vehicle network. The communications units involved are equipped with suitable software for this purpose.

The invention further provides a method for authorizing communication between a first vehicle-based communications unit of a first vehicle, which first communications unit is assigned to a control unit, and a second vehicle-based communications unit of a second vehicle, which second communications unit is assigned to a control unit, wherein there is a physical-mechanical connection between the two vehicles. The method has the features disclosed below. There is an unauthorized wireless connection between the two vehicle-based communications units. The first vehicle-based communications unit sends to the second vehicle-based communications unit via the wireless connection a request to authorize communication. Then one of the two vehicle-based communications units prompts the other vehicle-based communications unit via the wireless connection for an acknowledgment. The acknowledgment is made on the physical-mechanical connection. After acknowledgment is made, an authorized wireless connection is set up.

Alternatively, the prompt for acknowledgment can be made via the physical-mechanical connection, and the acknowledgment itself made via the wireless connection or via the physical-mechanical connection. The wireless connection between two vehicles coupled together can be verified and authorized easily using the method described. A trigger for the authorization may be, for example, the coupling of two vehicles or a request by a mobile communications unit to one of the vehicle-based communications units.

The invention also provides a control unit for use in the vehicle network, which control unit comprises a vehicle-based communications unit and is intended for implementing the methods explained above. The control unit is typically an electronic brake control unit. The control unit contains a vehicle-based communications unit for wireless communication, in particular for a WLAN. The vehicle-based communications unit can also be provided outside the control unit and is then assigned to the control unit. Control unit and communications unit comprise the software needed to implement the method.

Finally, the invention provides a system for implementing the method, which system comprises a mobile communications unit, a vehicle, a control unit in the vehicle, and a vehicle-based communications unit assigned to the control unit. The communications units and the control unit comprise the software needed to implement the method and/or are designed and configured to implement the method.

The rest of the description and the claims contain further features of the invention. Advantageous embodiments of the invention are explained in more detail below. Still other objects and advantages of the present invention will be in part by apparent and will in part be obvious from the specification.

BRIEF DESCRIPTION OF THE DRAWINGS

The invention is described in greater detail below with reference to the accompanying drawing figures, in which.

DETAILED DESCRIPTION

Figure 1:
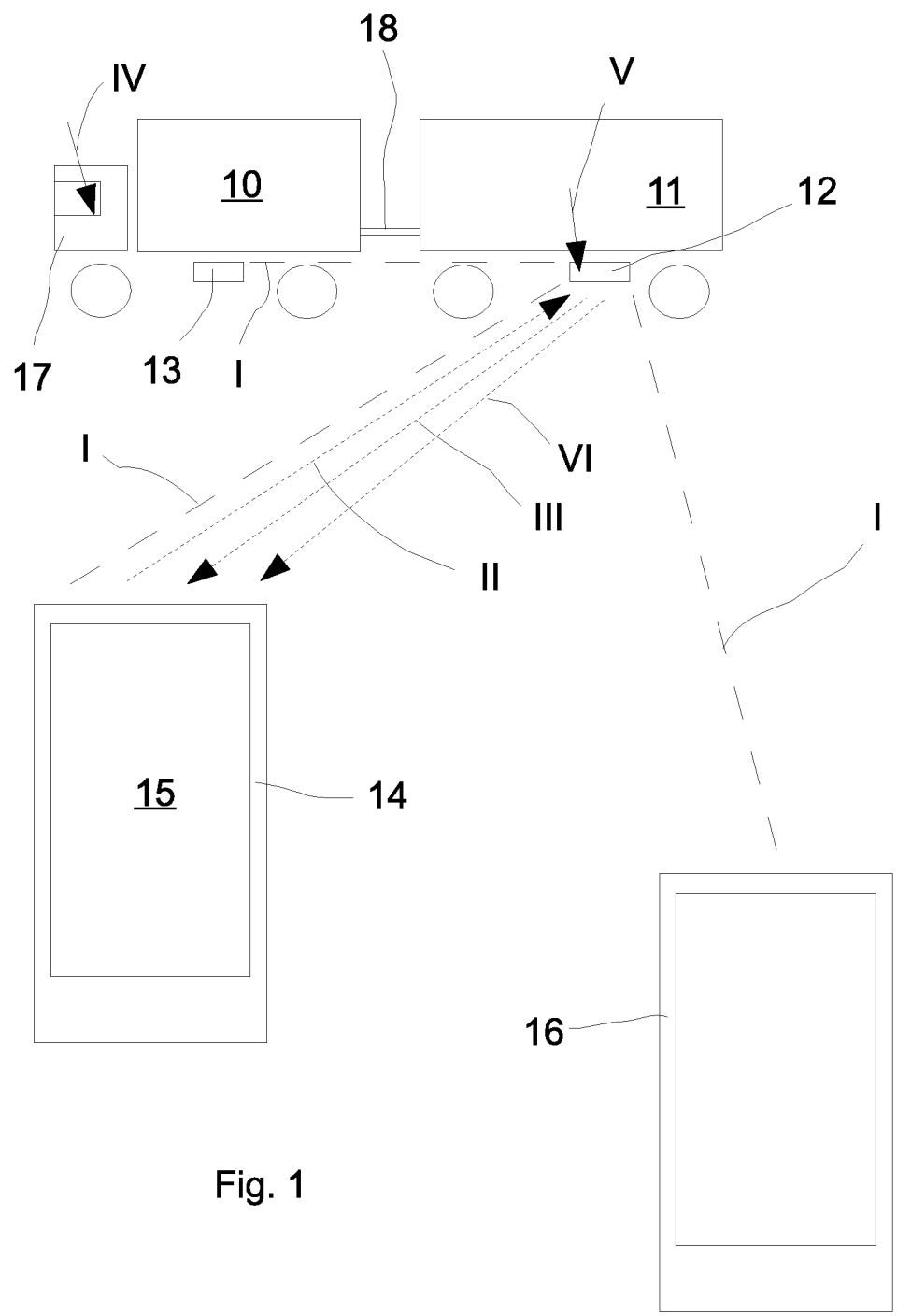
FIG. 1 is a schematic diagram of a wireless vehicle network (of a system) comprising a smart phone, a trailer vehicle and a motorized vehicle, showing the steps for authorizing a connection between the smart phone and the trailer vehicle.

FIG. 1 is used to explain the sequence for the authorization in a wireless vehicle network. It assumes a truck-trailer combination including a motorized vehicle 10 and a trailer vehicle 11. Both vehicles 10, 11 comprise an air brake system having an electronic braking system. An electronic brake control unit comprising a vehicle-based communications unit 12 is provided in the trailer vehicle 11. Similarly, an electronic brake control unit comprising a vehicle-based communications unit 13 is provided in the motorized vehicle 10. The two communications units 12, 13 are intended to be able to communicate wirelessly with each other in a WLAN.

An operator of the motorized vehicle 10 is equipped with a smart phone 14, which has a WLAN function in addition to the phone function, and works as a mobile communications unit. The two communications units 12, 13 and the smart phone 14 can together define the vehicle network. Of course two of the devices 12, 13, 14 can also form a (smaller) vehicle network.

In order to improve convenience and for unique identification in interaction with the smart phone 14, it is provided that motorized vehicle 10 and trailer vehicle 11 are each furnished with an optical pattern, specifically a QR code, in a defined position. The optical pattern contains the connection data required for setting up a WLAN connection between the vehicle 10 or 11 concerned and the smart phone 14. On the smart phone 14 is installed an app, which is provided by the manufacturer of the brake control unit, for example, and which, with knowledge of the data contained in the optical pattern, can be used to set up a connection. Once the connection is set up, the app accesses the information present in the control unit, and displays this data on a display 15 of the smart phone 14.

FIG. 1 shows an additional smart phone 16. This smart phone 16 belongs to the operator of another truck-trailer combination (not shown). The connection data associated with the trailer vehicle 11 is likewise stored in the smart phone 16, namely because the optical pattern on the trailer vehicle 11 has been captured previously. This situation can arise, for instance, if the operator of the smart phone 16 has captured the optical pattern on the trailer vehicle 11 previously in order to read the information present in the control unit.

Both the app in the smart phone 16 comprising the WLAN function and the vehicle-based communications unit 12, are configured and provided such that a connection is automatically established as soon as the smart phone 16 is located in the range of the communications unit 12 and a connection is possible. As shown in FIG. 1, two or more smart phones 14, 16 can thereby be connected to the vehicle-based communications unit 12. The connections concerned are denoted in FIG. 1 by the numeral I. These are what are called unauthorized connections, via which it is only possible to retrieve information. The two vehicle-based communications units 12 and 13 can communicate with one another in a similar manner via an unauthorized connection I.

The operator of the truck-trailer combination consisting of motorized vehicle 10 and trailer vehicle 11 may like to control functions in the trailer vehicle 11 remotely, for instance change a level by controlling the pressure in an air suspension system. To do this, the operator uses his smart phone 14 to send to the communications unit 12 a request to authorize communication (see arrow II). The communications unit 12 sends to the smart phone 14 from which the request came, an instruction to perform an action on the vehicle (see arrow III). This "action" on the vehicle is shown on the display and may be, for example, actuating a brake pedal or putting into reverse gear.

Such actions are actions that can typically be detected in the communications unit 12 of the trailer vehicle 11, or more precisely in the associated control unit. Thus actuating the brake pedal of the service brake results in a change to the control pressure and in illumination of the brake lights. Both can be detected in the control unit of the communications unit 12. To perform the instructed action on the vehicle, the operator must in this case be inside a driver's cab 17 of the motorized vehicle 10 (see arrow IV). The control unit detects the performed action (see arrow V), and the vehicle-based communications unit 12 authorizes communication with the smart phone 14 (see arrow V). After sending the authorization and/or after arrival of the authorization in the smart phone 14, the smart phone is authorized to invoke functions in the trailer vehicle 11, with the result that remote control of the defined functions is possible. Smart phone 14 and communications unit 12 comprise the software required for this purpose. A person skilled in the art in this field is able to write such software on the basis of the described conditions and features.

The smart phone 16 continues to have only the unauthorized connection, because a request for authorization of communication has not been addressed to the communications unit 12 from the smart phone 16. Once the communications unit 12 has authorized the smart phone 14, authorizations to other smart phones are no longer permitted. Only once the smart phone 14 terminates the connection or aborts the connection for other reasons is it again possible to re-authorize the connection to precisely one mobile communications unit.

FIG. 1 also shows a dashed line I between the communications units 12 and 13. This is an optionally possible wireless connection between the communications units. The respective associated control units can thereby also communicate with one another. The wireless connection is established on the basis of a model similar to that between the smart phone 14 and the communications unit 12:

between motorized vehicle 10 and trailer vehicle 11 is a physical-mechanical connection 18, which in this case, in addition to a tow bar, contains a pneumatic line for a system pressure, an additional pneumatic line for a control pressure and an electrical cable having an interface that complies with ISO 7638 or ISO 11992. A brake-light signal and/or a limited amount of data can be transmitted via the electrical cable.

The two vehicle-based communications units 12, 13 can "see" each other in the WLAN network. There is at least one unauthorized wireless connection. Via this connection, one of the two communications units 12, 13 sends to the other communications unit a request to authorize communication. Thereupon, one of the two communications units 12, 13 sends to the other communications unit via the wireless connection a prompt for an acknowledgment, specifically for an acknowledgment on the physical-mechanical connection. The other communications unit then actuates the acknowledgment on the physical-mechanical connection. Specifically, the assigned control unit initiates a function that produces the required acknowledgment, e.g. opening and closing a valve in the air brake system to produce a change in the control pressure or system pressure, which can be detected by the other control unit. After acknowledgment is made, it is certain that an accidental connection to an "uninvolved" communications unit has not been established. Thus authorization is now given to the wireless connection between the two vehicle-based communications units.

In the example described above, the acknowledgment prompt is made via the wireless connection, whereas the acknowledgment itself is made via the physical-mechanical connection. Alternatively, it can be performed the opposite way around: one of the communications units prompt the other communications unit via the physical-mechanical connection for an acknowledgment; the acknowledgment itself is made via the wireless mechanical connection. In addition in this case, the acknowledgment can also be made via the physical-mechanical connection.

A defined time interval or a time window can be provided for the time interval between the acknowledgment prompt and the acknowledgment. If an acknowledgment is made outside the time window, the acknowledgment is ignored. The wireless connection is then not given authorization.

The vehicle-based communications units are typically assigned to the electronic brake control units of the vehicles. The control units, however, may also be other electronic control units in the vehicles involved. There should, however, be a data connection to other control units or to the CAN bus of the vehicle concerned.

With suitable software in the communications units 12 and 13, it is possible in the example of FIG. 1 to use the smart phone 14 also to control functions of the motorized vehicle 10. The signal path then runs from the smart phone 14 via the communications unit 12 to the communications unit 13 of the motorized vehicle 10.

Figure 2:
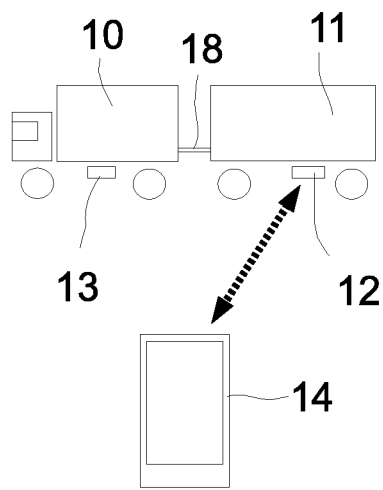
FIG. 2 is a highly simplified representation of the diagram in FIG. 1.
Figure 3:
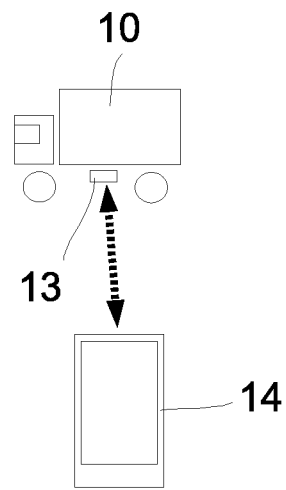
FIG. 3 is a diagram similar to FIG. 2 but only comprising a smart phone and a motorized vehicle.
Figure 5:
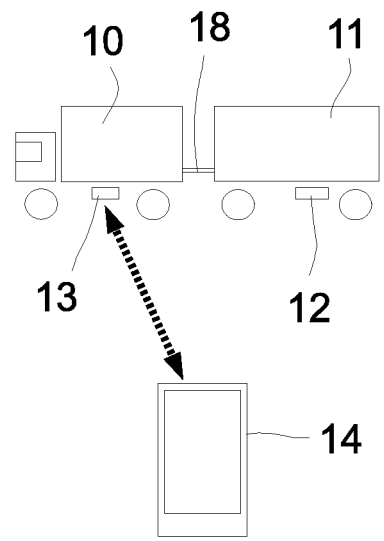
FIG. 5 is a diagram similar to FIG. 2 but having a wireless connection between the smart phone and the motorized vehicle.

FIG. 2 is a simplified representation of FIG. 1. FIGS. 3 and 5 show variations of the configuration shown in FIGS. 1 and 2.

FIG. 3 relates to the possible coupling between the smart phone 14 and the communications unit 13 of the motorized vehicle 10. This is useful, for example, when the driver would like to perform and check functions of the vehicle from outside the vehicle.

Figure 4:
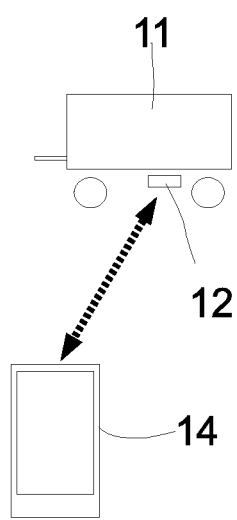
FIG. 4 is a diagram similar to FIG. 2 but only comprising a smart phone and a trailer vehicle, i.e. without a motorized vehicle.

FIG. 4 relates to the coupling of the smart phone 14 only to the trailer vehicle 11, or more precisely to the communications unit 12 thereof. There is no physical-mechanical connection to a motorized vehicle. This combination is relevant particularly to trailer vehicles having electrical power generator or energy store. For example, refrigeration trailers may have an on-board generator, and supply electrical power to the systems of the trailer vehicle.

FIG. 5 again concerns the truck-trailer combination consisting of motorized vehicle 10 and trailer 11. Unlike FIGS. 1 and 2, however, there is an authorized connection between the smart phone 14 and the communications unit 13 of the motorized vehicle 10. This situation arises, for example, if a combination as shown in FIG. 3 initially exists and then the trailer vehicle 11 is attached.

What is claimed is:

1. A method for authorizing communication between a mobile communications unit and a vehicle-based communications unit assigned to a control unit in a vehicle, wherein there is an unauthorized connection between the mobile communications unit and the vehicle-based communications unit, comprising the steps of:
   a) sending to the vehicle-based communications unit a request from the mobile communications unit to authorize communication;
   b) sending to the mobile communications unit from which the request came, an instruction to perform a braking action on the vehicle from the vehicle-based communications unit;
   c) performing the braking action by an operator having access to the mobile communications unit and the vehicle;
   d) detecting by the control unit the braking action based on a change in a braking pressure or actuation of a brake light, and authorizing by the vehicle-based communications unit communication with the mobile communications unit.

2. The method as claimed in claim 1, wherein the control unit initiates in conjunction with, or after, step d), a visual or audible or measurable action of the vehicle.

3. The method as claimed in claim 1, wherein the communication between mobile communications unit and vehicle-based communications unit is performed in encrypted form.

4. The method as claimed in claim 3 wherein the encrypted form of the communication between the mobile communications unit and the vehicle-based communications unit comprises symmetrical encryption.

5. The method as claimed in claim 1, wherein the authorization of communication includes remote control of functions in the vehicle by the mobile communications unit.

6. The method as claimed in claim 1, wherein the unauthorized connection includes the mobile communications unit retrieving information about the vehicle.

7. The method as claimed in claim 1, wherein the vehicle network is a WLAN.

8. The method as claimed in claim 7 wherein the WLAN contains the mobile communications unit as a client.

9. The method as claimed in claim 1, wherein the unauthorized connection is established by scanning an optically detectable pattern into the mobile communications unit, wherein there is an association between the optically detectable pattern and the vehicle-based communications unit, and wherein the optical pattern contains all the data that is needed to set up the connection between mobile communications unit and vehicle-based communications unit.

10. The method as claimed in claim 1, wherein the mobile communications unit comprises a mobile phone.

11. The method as claimed in claim 10 wherein the mobile phone has an optical sensor and/or a WLAN function.

12. The method as claimed in claim 1, wherein in addition to a first vehicle-based communications unit, at least one second vehicle-based communications unit assigned to a control unit is present in the wireless vehicle network, the second vehicle-based communications unit being part of an additional vehicle,
   wherein there is an unauthorized wireless connection between the two vehicle-based communications units,
   wherein there is a physical-mechanical connection between the vehicles,
   wherein the first vehicle-based communications unit sends to the second vehicle-based communications unit via the wireless connection a request to authorize communication, and wherein one of the two alternatives a) or b) is performed:
   a) one of the vehicle-based communications units prompts the other vehicle-based communications unit via the wireless connection for an acknowledgment, the acknowledgment is made on the physical-mechanical connection, and an authorized wireless connection is set up; or
   b) one of the vehicle-based communications units prompts the other vehicle-based communications unit via the physical-mechanical connection for an acknowledgment, the acknowledgment is made via the wireless connection or via the physical-mechanical connection, and an authorized wireless connection is set up.

13. The method as claimed in claim 12 wherein alternative a) is performed.

14. The method as claimed in claim 12 wherein alternative b) is performed.

15. A control unit for use in a vehicle network, said control unit comprising a vehicle-based communications unit for implementing the method as claimed in claim 1.

16. A system for implementing the method as claimed in claim 1, which system comprises a mobile communications unit, a vehicle, a control unit in the vehicle, and a vehicle-based communications unit assigned to the control unit.

* * * * *